(12) United States Patent
Prosyk

(10) Patent No.: US 9,244,327 B2
(45) Date of Patent: Jan. 26, 2016

(54) MACH-ZEHNDER MODULATOR WITH BACKPLANE VOLTAGE EQUALIZATION

(71) Applicant: TERAXION INC., Québec (Québec) (CA)

(72) Inventor: Kelvin Prosyk, Ottawa (CA)

(73) Assignee: TERAXION INC. (CA)

( * ) Notice: Subject to any disclaimer, the term of this patent is extended or adjusted under 35 U.S.C. 154(b) by 95 days.

(21) Appl. No.: 14/263,491

(22) Filed: Apr. 28, 2014

(65) Prior Publication Data

US 2015/0286108 A1 Oct. 8, 2015

Related U.S. Application Data

(60) Provisional application No. 61/816,284, filed on Apr. 26, 2013.

(51) Int. Cl.
G02F 1/035 (2006.01)
G02F 1/225 (2006.01)
G02F 1/01 (2006.01)
G02F 1/21 (2006.01)

(52) U.S. Cl.
CPC .............. *G02F 1/225* (2013.01); *G02F 1/0123* (2013.01); *G02F 2001/212* (2013.01)

(58) Field of Classification Search
None
See application file for complete search history.

(56) References Cited

U.S. PATENT DOCUMENTS

| 6,600,843 | B2* | 7/2003 | Sriram et al. | 385/2 |
| 7,024,057 | B2* | 4/2006 | Li et al. | 385/3 |
| 7,231,102 | B2* | 6/2007 | Ridgway | 385/9 |
| 7,782,520 | B2* | 8/2010 | Adamiecki et al. | 359/279 |
| 8,737,773 | B2* | 5/2014 | Motoya et al. | 385/3 |
| 2010/0150494 | A1* | 6/2010 | Prosyk et al. | 385/2 |
| 2011/0135242 | A1* | 6/2011 | Prosyk | 385/3 |
| 2013/0163913 | A1* | 6/2013 | Prosyk | 385/3 |
| 2013/0170783 | A1* | 7/2013 | Evans et al. | 385/3 |
| 2013/0209023 | A1 | 8/2013 | Prosyk | |
| 2014/0355926 | A1* | 12/2014 | Velthaus | 385/3 |

FOREIGN PATENT DOCUMENTS

EP 2615489 * 7/2013 ............ G02F 1/1225

OTHER PUBLICATIONS

Chen et al., Monolithic Silicon Chip with 10 Modulator Channels at 25 Gbps and 100-GHz Spacing, Optical Society of America, ECOC Postdeadline Papers, 978-1-55752-932-9/11, Sep. 19, 2011, USA.

(Continued)

*Primary Examiner* — Tina Wong
(74) *Attorney, Agent, or Firm* — Hovey Williams LLP

(57) ABSTRACT

Mach-Zehnder optical modulators and IQ modulators based on a series push-pull travelling wave electrode are provided. The modulator includes a conductive backplane providing an electrical signal path. One or more voltage control taps are electrically connected to the conductive backplane within an area underneath the travelling wave electrode and provide an equalizing DC control voltage to the conductive backplane. In other variants, a plurality of conductive backplane segments are provided, and at least one voltage control tap is electrically connected to each conductive backplane segment within an area underneath the travelling wave electrode and provides a DC control voltage to the corresponding conductive backplane segment.

21 Claims, 11 Drawing Sheets

(56) References Cited

OTHER PUBLICATIONS

Chen et al., Chirp and Dispersion Tolerance of a Single-Drive Pus-Pull silicon Modulator at 28 Gb/s, IEEE Photonics Technology Letters, vol. 24 No. 11, p. 936-938, Jun. 1, 2012.

Chen et al., Hybrid Silicon Modulators, Proc. of SPIE, vol. 7220, 722008, p. 1-7, 2009.

Dong et al., High-speed low-voltage single-drive push-pull silicon Mach-Zehnder modulators, Optical Society of America, Optics express, vol. 20 No. 6, p. 6163-6169, Feb. 29, 2012.

Klein et al., 1.55um Mach-Zehnder Modulators in InP for optical 40/80 Gbit/s transmission networks, IEEE, p. 171-173, 2006.

Prosyk et al., Travelling Wave Mach Zehnder Modulators, Presentation at the conference of "Indium phosphide and related materials" (IPRM), given Monday, May 20, 2013, paper MoD3-1 (invited).

Walker, R.G., High-Speed III-V Semiconductor Intensity Modulators, IEEE Journal of Quantum Electronics, vol. 27 No. 3, p. 654-667, Mar. 1991.

\* cited by examiner

MACH-ZEHNDER MODULATOR WITH BACKPLANE VOLTAGE EQUALIZATION

RELATED APPLICATION

This application claims priority benefit of a provisional application entitled, "MACH-ZEHNDER MODULATOR WITH BACKPLANE VOLTAGE EQUALIZATION," Ser. No. 61/816,284, filed Apr. 26, 2013 and incorporated by reference herein in its entirety.

FIELD OF THE INVENTION

The present invention generally relates to Mach-Zehnder modulators, and more particularly concerns a series push-pull modulator provided with backplane voltage equalization.

BACKGROUND

Optical modulators have been employed for many years in the field of optical communications to accept modulated data in electrical format (typically radio frequency or RF) and transfer the data onto an optical carrier. In a Mach-Zehnder optical modulator 20, as generally shown in FIG. 1 (PRIOR ART), a beamsplitter 22 divides the laser light from an input optical waveguide 24 into two optical beams propagating in parallel waveguides defining optical paths 28A and 28B, at least one of which having a phase modulator in which the refractive index is a function of the strength of the locally applied electric field. In the example of FIG. 1 light in both optical paths 28A, 28B undergoes a phase modulation, although in other configurations the refractive index in only one of the optical paths could be modulated with respect to the other. The beams are then recombined by an output optical combiner 26. Changing the electric field on the phase modulating paths determines whether the two beams interfere constructively or destructively when recombined, and thereby controls the amplitude or intensity of the exiting light. In some configurations, the phase of the exiting light can be controlled via a variety of means such as by manipulating the phase modulation signal, or through design.

In the configuration shown in FIG. 1, the modulating electric field is provided by a segmented Travelling Wave Electrode 21 (or TWE) that consists of two or more transmission line conductors 30A, 30B oriented substantially parallel to the optical paths 28A, 28B, and a plurality of pairs of waveguide electrodes 32A, 32B. Each waveguide electrode 32A, 32B is connected to one of the transmission line conductors 30A, 30B via a corresponding tap or bridge conductor 34A, and 34B. Each bridge conductor 34A, 34B branches out of one of the transmission line conductors 30A, 30B in a direction substantially perpendicular to the optical paths 28A, 28B. The transmission line conductors 30A, 30B convey an RF signal along an RF path that is substantially parallel to the optical paths 28A, 28B.

The configuration shown in FIG. 1 is known as a Mach-Zehnder modulator operated in "push-pull" mode is referred to as a series push-pull travelling wave electrode, after Klein et al., "1.55 µm Mach-Zehnder Modulators on InP for optical 40/80 Gbit/s transmission networks", OFC/NFOEC 2006, paper TuA2, and described in further detail by R. G. Walker, "High-Speed III-V Semiconductor Intensity Modulators", IEEE J. Quant. Elect., vol. 27(3), pp. 654-667, 1991. In a series push-pull configuration, a single voltage signal or field is used to phase modulate the interfering signals in the two arms in anti-phase. Each pair of waveguide electrodes 32A, 32B, as shown in FIG. 1, impart a phase change to the optical wave in the waveguide 28A, 28B and also act as a pair of capacitors in series and as a load on the main transmission line conductors 30A, 30B.

A travelling wave electrode Mach-Zehnder optical modulator can be driven using either a single RF signal input, or two RF signal inputs in anti-phase. Referring for example to FIG. 1, in a single-ended design the two transmission line conductors 30A, 30B may respectively act as a signal transmission line conductor (S) conveying the input electrical signal, and a ground transmission line conductor (G) connected to a ground reference. This modulator configuration is sometimes referred to as an SG modulator (also known as a coplanar strip). It should be noted that other types of RF drives are known in the optical telecommunications industry, requiring other arrangements of transmission line conductors in the modulator. For example, the prior art includes optical modulators with differential-drive GSGSG and GSSG formats (see for example applicant's U.S. patent application published under number US2013/0209023 (PROSYK) "Mach-Zehnder Optical Modulator Using A Balanced Coplanar Stripline With Lateral Ground Planes", filed on Feb. 14, 2013).

FIG. 1A (PRIOR ART) is an elevation view of section A of the optical modulator of FIG. 1, showing two pairs of waveguide electrodes 32A, 32B. Each waveguide electrode 32A, 32B extends over a p-i-n junction 36A, 36B, formed within the corresponding waveguide branch. The p-layer 38A, 38B is in contact with the corresponding waveguide electrode 32A, 32B and the n-layer 40A, 40B is in contact with a common conducting backplane 42. The i-layer 39A, 39B contains a series of layers of InGaAsP of varying composition that acts as the waveguiding core. The entire structure extends on a semi-insulating substrate 43. When an instantaneous change is applied in the voltage difference between the transmission line conductors 30A and 30B, a RF current 44 flows from the highly p-doped contact material 38A beneath waveguide electrode 32A, through the corresponding p-i-n junction 36A and the common conducting backplane 42, and up through the opposite p-i-n junction 36B. The direct current (DC) bias voltage of the backplane 42 is typically fixed by an external DC voltage source (not shown). A simplified electrical diagram of this configuration is shown in FIG. 2. The p-i-n semiconductor layers act as capacitors C that are connected in series through the common conducting backplane 42. This series connection halves the required loading capacitance on the main signal transmission line conductor compared to designs with electrically-independent Mach-Zehnder arms, leading to major performance advantages with regards to bandwidth.

Another type of Mach-Zehnder optical modulator known in the art is an in-phase quadrature modulator, or IQ modulator, for example described in Prosyk et al., "Tunable InP-based IQ modulator for 160 Gb/s", ECOC 2011 post-deadline paper Th.13.A.5. An example of an IQ modulator 80 is shown in FIG. 3 (PRIOR ART). It includes two series push-pull travelling wave Mach-Zehnder modulators 20a and 20b, nested within a parent Mach-Zehnder interferometer. The parent Mach-Zehnder modulator is defined by a parent input optical waveguide 82 which received an input optical signal, a parent beamsplitter 84 splitting the optical signal into first and second parent optical branches 86A and 86B, each hosting one of the Mach-Zehnder optical modulators 20A and 20B, and a parent combiner 88 that recombines the beams outputted by the individual Mach-Zehnder modulators. In contrast to a standard Mach-Zehnder modulators, which typically is operated by switching between two binary data states (e.g., on and off), IQ modulators may be suited to switching between four states, using a signaling format known as quadrature phase shift keying. This format has many advantages over binary signaling schemes, such as an increase in data rate and efficient use of the optical spectrum.

Although series push-pull travelling wave architecture provides many advantages for Mach-Zehnder and IQ modulators, some difficulties may arise with such designs when high optical powers are coupled into the input waveguide. This is particularly true for Mach-Zehnder and IQ modulators fabricated from direct bandgap semiconductors, such as the compound semiconductor indium gallium arsenide phosphide, as used in the modulators of Klein and Prosyk above. Furthermore, the behavior of series push-pull travelling wave Mach-Zehnder modulator and IQ modulators can depend sensitively on the magnitude of the DC bias applied to the p-i-n junctions. Non-uniformity in the backplane voltage can negatively impact performance, such as the amount of optical phase shift per unit change in electrical signal. Also, other electrodes and diodes in the optical path which share the common backplane, such as DC phase control electrodes as described, for example, in FIG. 1(a) of the Prosyk paper, may also suffer in performance and stability.

Accordingly there is a need in the art for improved series push-pull travelling wave Mach-Zehnder modulators which can alleviates at least some of the disadvantages inherent to the prior art.

SUMMARY

In accordance with one aspect, there is provided a Mach-Zehnder optical modulator for modulating an input optical beam according to an electrical modulation signal. The Mach-Zehnder modulator includes an optical structure dividing the input optical beam into two optical beam components propagating in two parallel optical waveguide branches, respectively, and recombining these optical beam components downstream the optical waveguide branches.

The Mach-Zehnder modulator further includes a series push-pull travelling wave electrode extending over the optical waveguide branches and modulating a relative phase of the optical beam components. The travelling wave electrode includes transmission line conductors conveying the electrical modulation signal, and a plurality of pairs of waveguide electrodes. The waveguide electrodes of each pair are each coupled to one of the optical waveguide branches, respectively, and electrically connected to one of the transmission line conductors, respectively.

The Mach-Zehnder modulator further includes a conductive backplane extending underneath the optical waveguide branches and the travelling wave electrode. The conductive backplane provides an electrical signal path for the electrical modulation signal between the respective waveguide electrodes of each pair. At least one voltage control tap is provided electrically connected to the conductive backplane within an area underneath the travelling wave electrode. Each voltage control tap provides an equalizing DC control voltage to the conductive backplane.

In accordance with another aspect, there is also provided another Mach-Zehnder optical modulator for modulating an input optical beam according to an electrical modulation signal. The Mach-Zehnder modulator includes an optical structure dividing the input optical beam into two optical beam components propagating in two parallel optical waveguide branches, respectively, and recombining the optical beam components downstream the optical waveguide branches. The Mach-Zehnder modulator further includes a series push-pull travelling wave electrode extending over the optical waveguide branches and modulating a relative phase of the optical beam components. The travelling wave electrode includes transmission line conductors conveying the electrical modulation signal, and a plurality of pairs of waveguide electrodes. The waveguide electrodes of each pair are coupled to one of the optical waveguide branches, respectively, and electrically connected to one of the transmission line conductors, respectively.

The Mach-Zehnder optical modulator also includes a plurality of conductive backplane segments extending underneath the optical waveguide branches and the travelling wave electrode. Each of the conductive backplane segments provides an electrical signal path for the electrical modulation signal between the respective waveguide electrodes of at least one of the pairs. At least one voltage control tap is provided and electrically connected to each of the conductive backplane segments within an area underneath the travelling wave electrode. Each voltage control tap provides a DC control voltage to the corresponding conductive backplane segment.

In accordance with yet another aspect there is also provided an in-phase quadrature optical modulator.

The in-phase quadrature optical modulator has a parent Mach-Zehnder interferometer which includes a parent input optical waveguide receiving an input optical signal, a parent beamsplitter splitting the input optical signal into parent optical beams propagating in first and second parent optical branches, first and second Mach-Zehnder optical modulators respectively provided in the first and second parent optical branches, and a parent combiner recombining the parent optical beams downstream the Mach-Zehnder modulators.

Each Mach-Zehnder optical modulator of the in-phase quadrature optical modulator includes:
  an optical structure dividing the corresponding parent optical beam into two optical beam components propagating in two parallel optical waveguide branches, respectively, and recombining these optical beam components downstream the optical waveguide branches;
  a series push-pull travelling wave electrode extending over the optical waveguide branches and modulating a relative phase of the optical beam components. The travelling wave electrode includes transmission line conductors conveying an electrical modulation signal and a plurality of pairs of waveguide electrodes. The waveguide electrodes of each pair are coupled to one of the optical waveguide branches, respectively, and electrically connected to one of the transmission line conductors, respectively;
  a conductive backplane extending underneath the optical waveguide branches and the travelling wave electrode. The conductive backplane provides an electrical signal path for the electrical modulation signal between the respective waveguide electrodes of each pair; and
  at least one voltage control tap electrically connected to the conductive backplane within an area underneath the travelling wave electrode and providing an equalizing DC control voltage to the conductive backplane.

Other features and advantages of the invention will be better understood upon reading of preferred embodiments thereof with reference to the appended drawings.

DETAILED DESCRIPTION OF EMBODIMENTS

Embodiments of the invention relate to Mach-Zehnder optical modulators. As one skilled in the art will readily understand, a Mach-Zehnder modulator is a device which induces a phase shift between two components of an input optical light beam in order to modulate the optical properties of the input light beam in accordance with interferometric principles. It will be readily understood that Mach-Zehnder modulators may have a variety of configurations and that the particular configurations described herein are provided by way of example only.

The input optical beam to be modulated by Mach-Zehnder modulators according to embodiments may have any optical characteristics appropriate for the application to which is destined the optical modulator. Optical modulators are used in a variety of contexts, for example for modulating light from a continuous wave (CW) laser source with no prior modulation encoded upon it, or further modulate the phase and/or amplitude of an optical signal formed from a series of regular pulses at intervals determined by the data rate. In the latter case, since the optical signal "returns to zero" at the end of every unit interval, the format is often referred to as "RZ". In another example, an optical modulator may be used to impose a modulation on a series of pulses as above, except that consecutive pulses are 180 degrees out of phase at the optical carrier frequency. In the Fourier spectrum, this has the effect of suppressing the optical carrier component, and is sometimes referred to as a "carrier suppressed return-to-zero" or CS-RZ modulation format. Of course, it will be readily understood that the above examples are given for illustrative purposes only.

Figure 1:
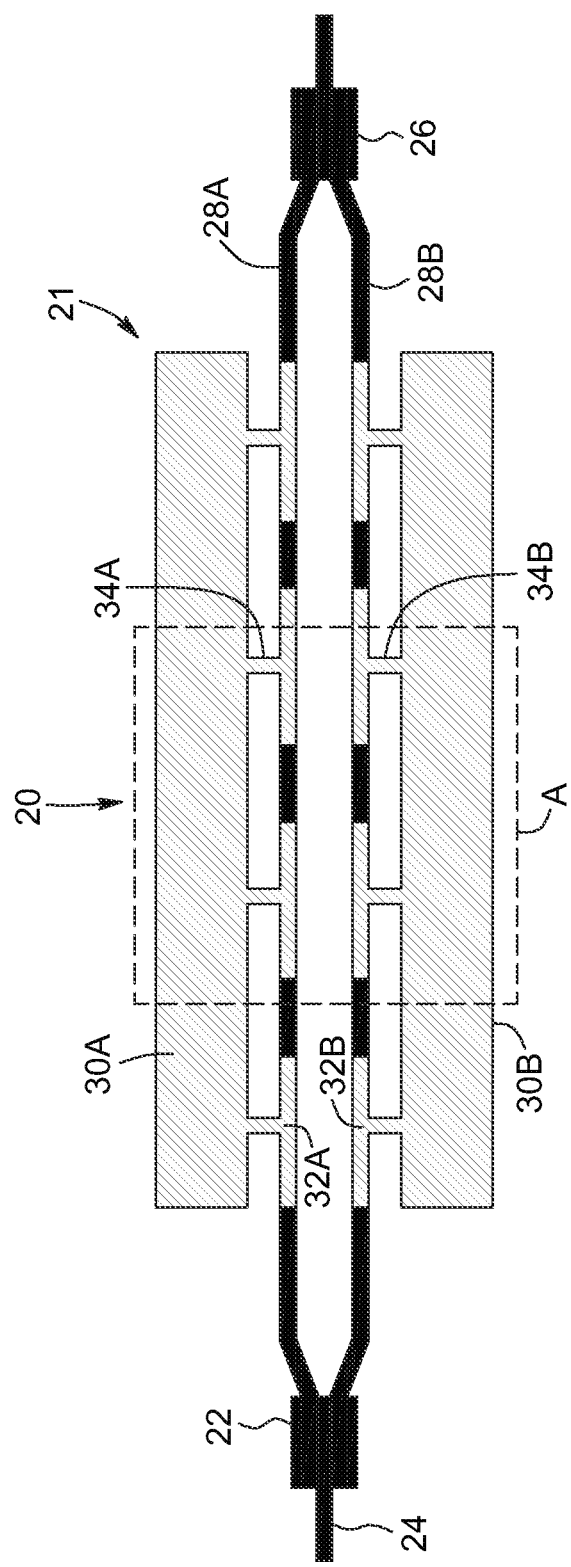
FIG. 1 (PRIOR ART) is a simplified schematic top view of a Mach-Zehnder optical modulator with a travelling wave electrode.
Figure 1A:
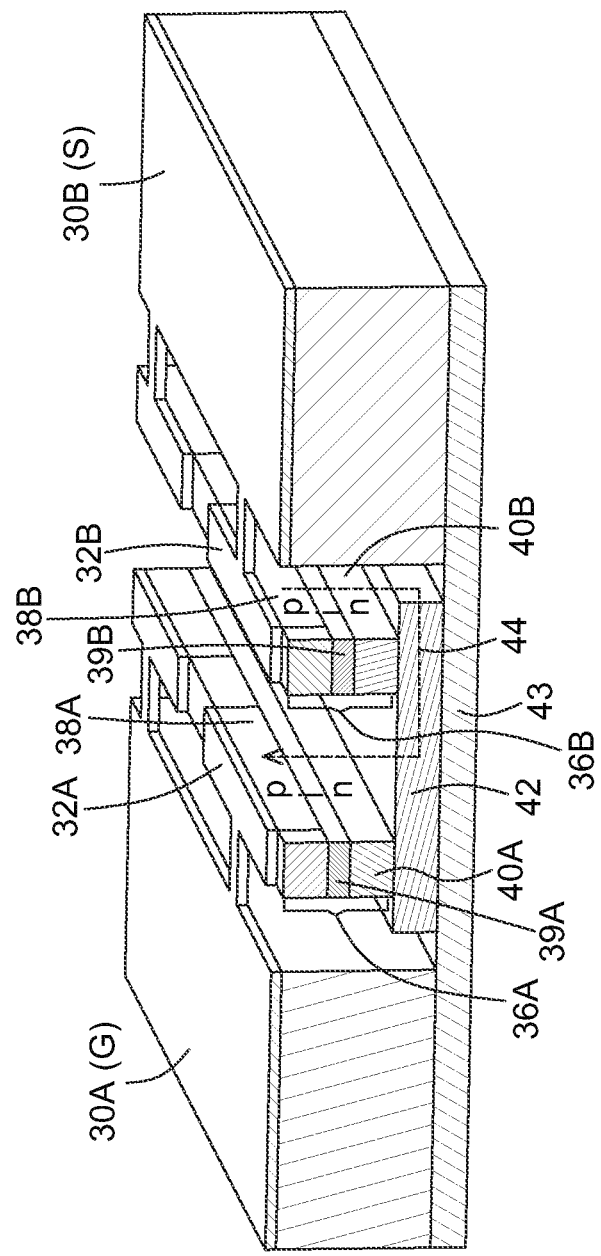
FIG. 1A (PRIOR ART) is a schematized elevation side view of a portion A of the optical modulator of FIG. 1.
Figure 2:
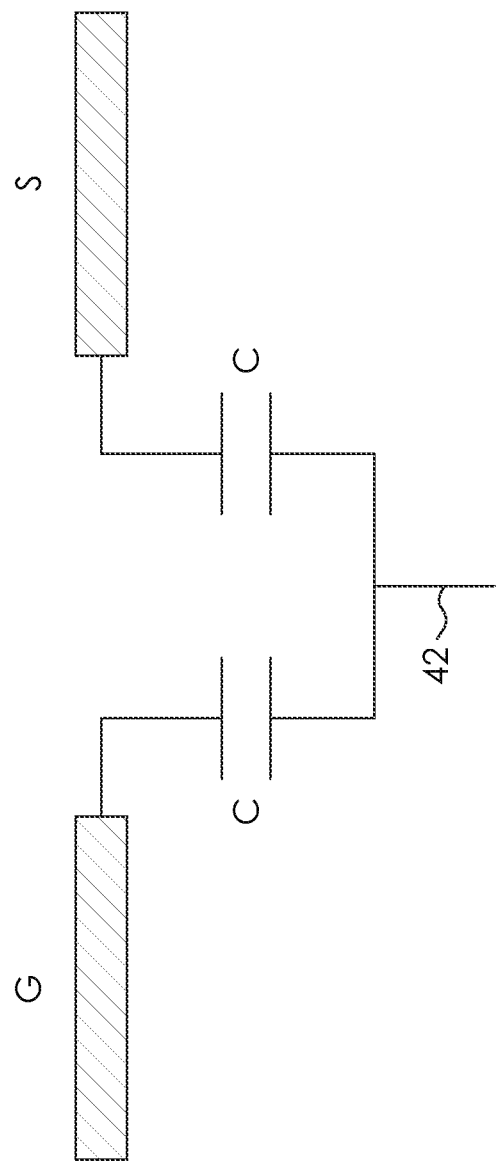
FIG. 2 (PRIOR ART) is a simplified circuit diagram associated with a pair of waveguide electrodes of the Mach-Zehnder modulator shown in FIG. 1.
Figure 3:
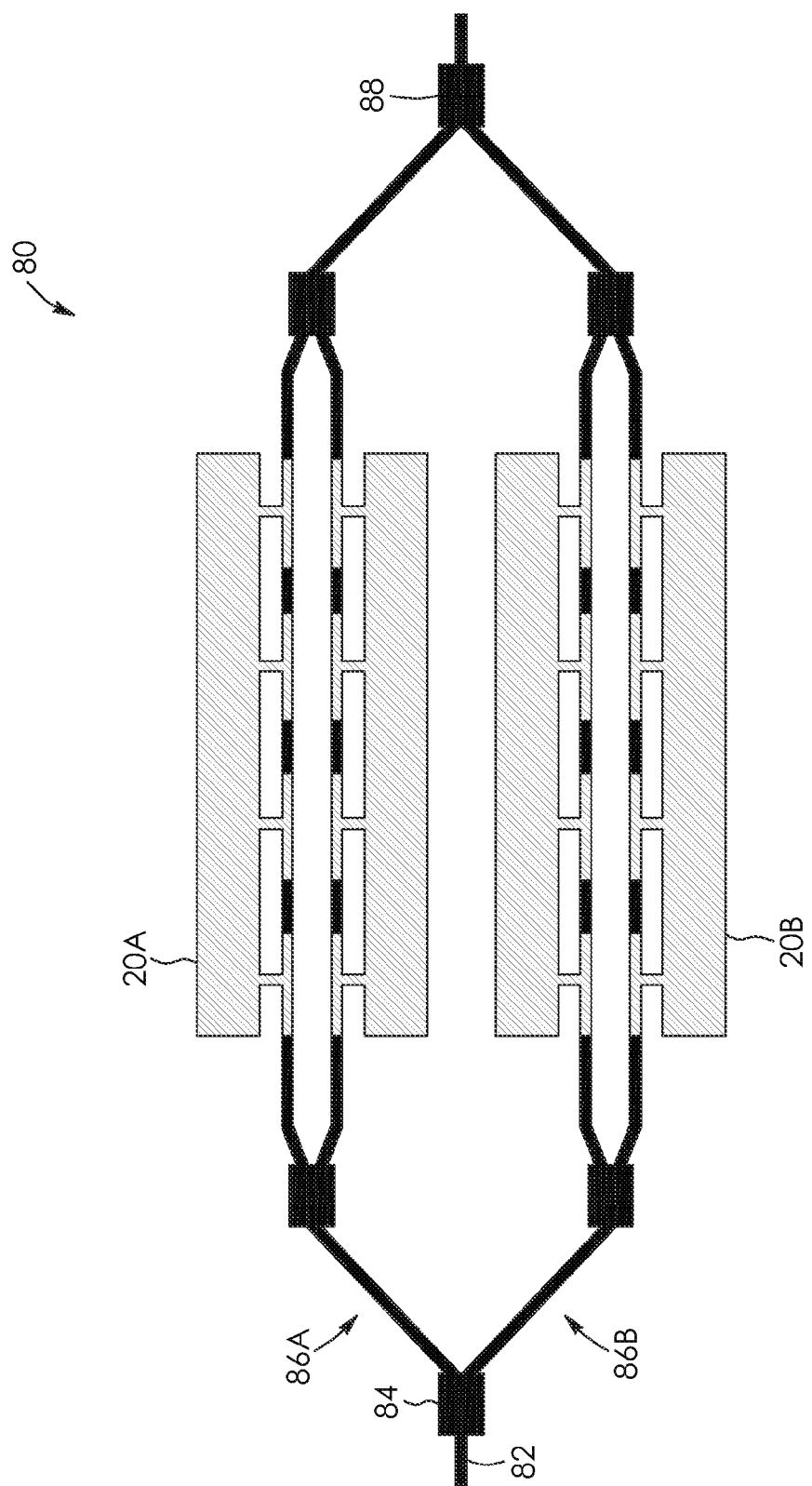
FIG. 3 (PRIOR ART) is a simplified schematic top view of an IQ modulator based on two Mach-Zehnder modulators.
Figure 4:
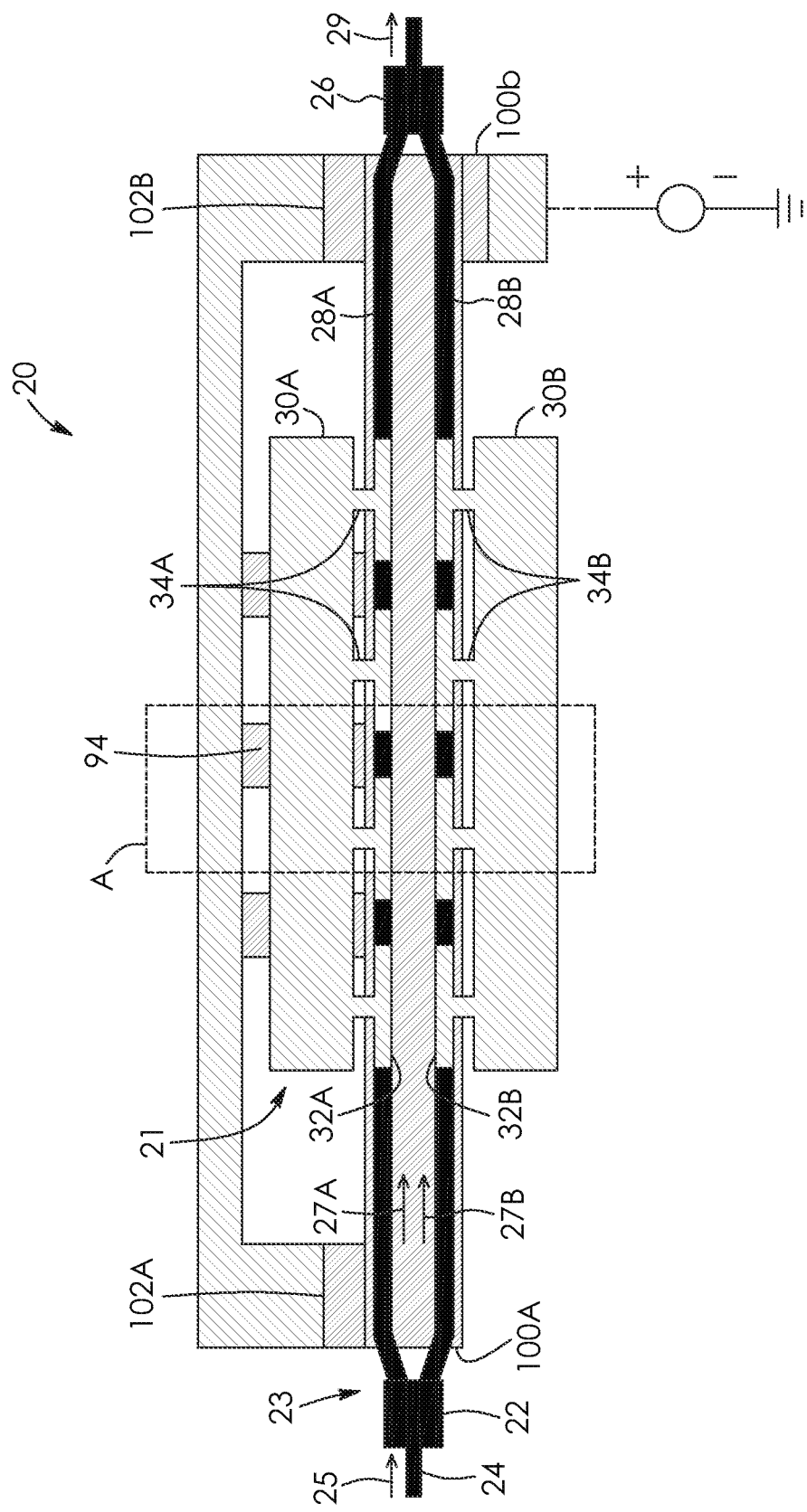
FIG. 4 is a simplified schematic top view of a series push-pull Mach-Zehnder modulator in a SG configuration, according to one embodiment.

With reference to FIG. 4, there is shown a schematic top view of a Mach-Zehnder optical modulator 20 according to one embodiment. The optical modulator 20 includes an optical structure 23 receiving the input optical beam 25 and dividing this input optical beam 25 into two optical beam components 27A, 27B propagating in two optical waveguide branches 28A, 28B, respectively. The optical structure 23 recombines the optical beam components 27A, 27B downstream the optical waveguide branches 28A, 28B, resulting in an output optical beam 29. In some applications, dual optical output beams can be provided. In some implementations, such as shown in FIG. 4, the input optical beam 25 is carried by an input waveguide 24, and a beam splitter 22 divides the input optical beam 25 into the two optical beam components 27A, 27B. The two optical beam components 27A, 27B are recombined after propagation through the optical waveguide branches 28A, 28B, for example by an output optical combiner 26.

In some embodiments, the optical structure 23 is defined by a semiconductor structure made of a plurality of layers patterned to provide the desired light guiding characteristics. In one example, the optical structure 23 may be defined by superposed layers of varying composition, such as the compound semiconductor indium gallium arsenide phosphide (InGaAsP) in different proportions of the constituent elements; such compositional differences result in differences in the index of refraction between the layers. The differences in index of refraction serve to confine the light in a given direction. In some embodiments, light confinement may be additionally achieved by etching away material in some regions, creating a semiconductor-to-air or dielectric-to-air interface, again resulting in an index contrast. Etched interfaces can also be covered with the application of a different material, for example etching away a portion to create a semiconductor-to-air interface, and then replacing the material that was etched away with a dielectric, to form a semiconductor-to-dielectric interface. In other implementations, superposed doped and undoped layers or differently doped layers of a same material such as lithium niobate may be provided and patterned to form ridge waveguiding constructions. As one skilled in the art will readily understand, optical structures appropriate for optical modulators may be made of a variety of materials and may be designed according to various patterns.

Typically, the beamsplitter 22 may be embodied by a multimode interference device (MMI), a directional coupler, a Y-junction splitter, or the like. In some implementations, the beamsplitter 22 divides the input light beam 25 such that the two resulting optical beam components 27A, 27B have a same optical power. Furthermore, the optical beam components 27A, 27B are coherent, that is, they have a constant relative phase.

The combiner 26 may be embodied by a MMI device or the like. A MMI relies on a transition from a narrow single mode guiding structure to a wider, multi-mode guiding structure. The multimode section is judiciously designed so that various optical modes carried by the optical waveguide branches 28A and 28B and input to the combiner 26 are combined together in the desired fashion to obtain the output optical beam 29.

Of course, it will be readily understood that the optical structure 23 may include additional components guiding, shaping or otherwise acting on the light travelling therein without departing from the scope of the invention.

The optical mode of light travelling in each optical waveguide branch 28A, 28B has an optical group index which is determined by the geometry and materials of the optical waveguide branches 28A, 28B. As is well known to those skilled in the art, the refractive index of an optical medium can be modified through the application of an electrical field. In a Mach-Zehnder configuration, this principle is used to adjust the relative phase of the optical beam components 27A, 27B guided along the optical waveguide branches 28A, 28B, thereby determining whether these optical beam components will interfere constructively or destructively once recombined into the output optical beam 29.

Still referring to FIG. 4, the Mach-Zehnder modulator 20 includes a series push-pull travelling wave electrode 21 modulating the relative phase of the optical beam components 27A, 27B as they propagate along the optical waveguide branches 28A, 28B.

The travelling wave electrode 21 includes two or more transmission line conductors 30 conveying the electrical modulation signal. In FIG. 4, the transmission line conductors are embodied by a signal transmission line conductor 30B (S) conveying the electrical modulation signal inside the modulator 20. The signal transmission line conductor S preferably extends longitudinally parallel to the optical waveguide 28B along a substantial portion of the length thereof. The travelling-wave electrode 21 further includes a ground transmission line conductor 30A (G), shown coupled to the other one of the optical waveguide branches 28A. The ground transmission line conductor G provides a return path for the electrical modulation signal. The ground transmission line conductor G preferably extends longitudinally parallel to the optical waveguide branch 28A, along a substantial portion of the length thereof. The configuration illustrated at FIG. 4 therefore corresponds to a SG configuration.

In a SG configuration, the electrical modulation signal circulating in the transmission line conductors may for example be provided by an RF voltage source (not shown) having a single signal output. In other embodiments, as will be described further below, more than two transmission line electrodes may be provided in a variety of configurations, such as a GSSG configuration.

The transmission line conductors 30A, 30B may be embodied by any electrode structures of suitable shape and construction. In typical embodiments, a metallic layer is deposited over the semiconductor structure embodying the optical structure 23, and patterned to define the transmission line conductors S and G. The metallic layer may for example be made of gold, aluminum, copper, a multilayer stack comprising titanium, platinum and gold, or the like.

The travelling wave electrode 21 further includes a plurality of pairs of waveguide electrodes 32. Each waveguide electrode 32A, 32B of a given pair is coupled to one of the optical waveguide branches 28A, 28B, respectively. In the illustrated design, the waveguide electrodes 32A, 32B extend over the corresponding waveguide branch. Each waveguide electrode 32A, 32B is electrically connected to either the signal transmission line conductor S or to the transmission ground line G. In the illustrated embodiment, these connections are provided by bridge conductors 34A, 34B, preferably embodied by a metallic segment linking the corresponding electrodes and conductors.

By "coupled" it is understood that the waveguide electrodes 32A, 32B are disposed relative to the corresponding optical waveguide branch 28A, 28B such that the propagation of the electrical modulation signal along the travelling wave electrode 21 generates a local electrical field within the optical waveguide branches 28A, 28B suitable to affect their refractive index, thereby changing their light transmission properties in accordance with the electrical modulation signal. As mentioned above, this allows a change in the relative phase of the optical beam components directly related to the electrical modulation signal.

The travelling electrode 21 extends over the optical waveguide branches, that is the transmission line conductors 30A, 30B and the waveguide electrodes 32A, 32B are all positioned within a plane or planes above a plane or planes of the optical waveguide branches 28A, 28B. It will be readily understood by one skilled in the art that in the context of the present description, references to "below", "under", "underneath", "above", "over", "vertically" and the like and made with respect to the frame of reference in which devices as described are typically manufactured, i.e. with a substrate defining a lowermost layer and other components successively extending above this substrate. Such a language is not meant to impart a preferred orientation for the device in practical applications.

The Mach-Zehnder modulator 20 operates in "push-pull" mode, where a single voltage signal or field is used to phase modulate the optical beam components 27A, 27B in the two waveguide branches 28A, 28B in anti-phase. In a series push-pull configuration, each pair of waveguide electrodes 32A, 32B also act as a pair of capacitors in series and as a load on the corresponding transmission line conductors S and G.

Still referring to FIG. 4, the Mach-Zehnder modulator 20 further includes a conductive backplane 42 extending underneath the optical waveguide branches 28A, 28B and the travelling wave electrode 21. The conductive backplane 42 provides an electrical signal path for the electrical modulation signal between the waveguide electrodes of each pair. In other words, the conductive backplane 42 connects the waveguide electrodes of a given pair in series.

Figure 4A:
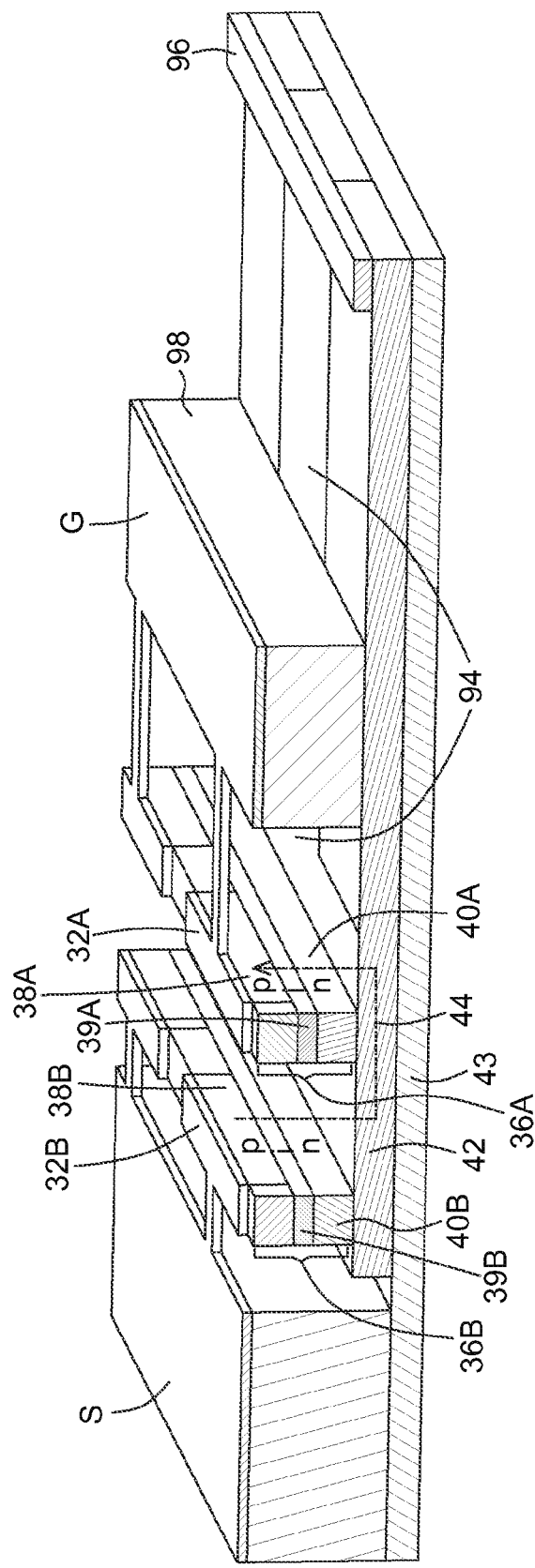
FIG. 4A is a schematized elevation side view of a portion A of the optical modulator of FIG. 4.

FIG. 4A is an elevation view of section A of the optical modulator 20 of FIG. 4, showing two pairs of waveguide electrodes 32A, 32B. Each waveguide electrode 32A, 32B extends over a p-i-n junction 36A, 36B, formed within the corresponding waveguide branch. The p-layer 38A, 38B is in contact with the corresponding waveguide electrode 32A, 32B and the n-layer 40A, 40B is in contact with the conducting backplane 42. The i-layer 39A, 39B contains a series of layers of InGaAsP of varying composition that acts as the waveguiding core. The entire structure extends on an insulating substrate 43. When an instantaneous change is applied in the voltage difference between the signal transmission line conductor S and the ground transmission line conductor G, a RF current 44 flows from the highly p-doped contact material 38B beneath waveguide electrode 32B, through the corresponding p-i-n junction 36B and the conducting backplane 42, and up through the opposite p-i-n junction 36A.

Figure 5:
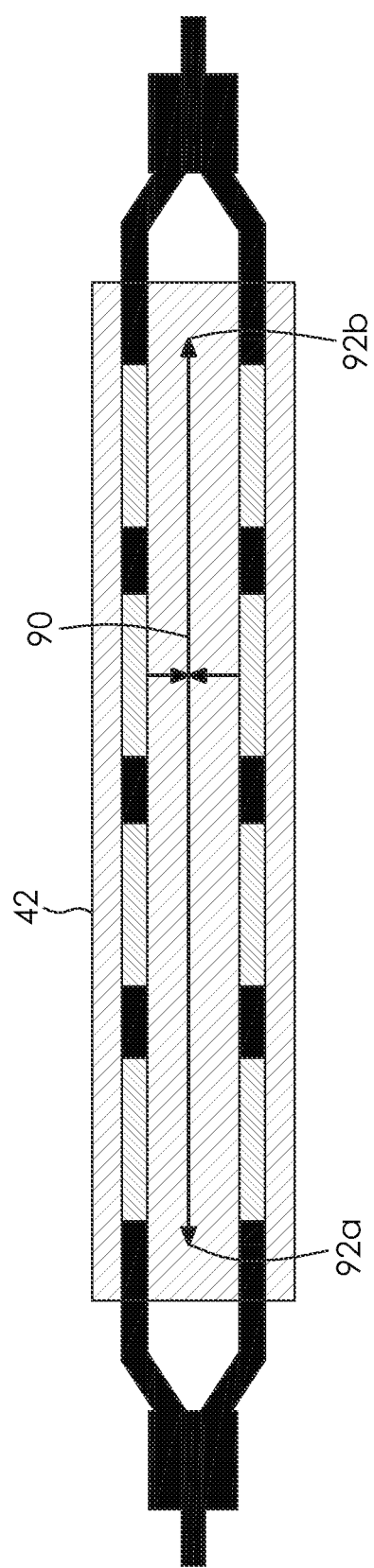
FIG. 5 is a partial top view of components of the modulator of FIG. 5, showing photocurrents on the conductive back.

As mentioned above, series push-pull travelling wave architecture may suffer from instability issues when high optical powers are coupled into the input waveguide, in particular for Mach-Zehnder modulators fabricated from direct bandgap semiconductors, such as the compound semiconductor indium gallium arsenide phosphide. Referring to FIG. 5, a portion of a modulator in SG configuration is shown, omitting the transmission line conductors for clarity. A hashed box indicates the extent in plan view of the conductive backplane 42. In direct bandgap semiconductors, a fraction of the optical signals propagating in the optical waveguide branches will be absorbed, resulting in a source of electrical current, called photocurrent, indicated as a path of arrows 90. Other phenomena may generate photocurrents along the backplane as well. The photocurrent 90 follows the length of the backplane 42 until it reaches the DC bias voltage source. Since the backplane has a finite conductance, the photocurrent 90 induces a voltage difference between different points along the length of the backplane. For high optical input power, the photocurrent can reach substantial amounts, such as 1 mA or more. Depending on the design, a conducting backplane can have a resistance between one end and the other of 1 kΩ, resulting in a possible voltage difference on the order of 1 volt or more on the backplane between the longitudinal extremities 92a and 92b of the travelling wave electrode.

Referring back to FIGS. 4 and 4A, the modulator 20 further includes one or more voltage control taps 94 electrically connected to the conductive backplane 42. The connection of each voltage control tap 94 to the conductive backplane 42 is positioned within an area underneath the travelling wave electrode 21, that is, between the longitudinal end points 92a, 92b of the travelling wave electrode 21. Each voltage control tap 94 may be embodied by a layer of a highly conductive material. In one embodiment, the voltage control taps 94 may be embodied by lateral protrusion of the conductive backplane 42, and therefore be made of n-InP or other material the backplane is made of. In other embodiments, the material of the voltage control taps may differ from the material of the backplane. In some embodiments, the voltage control taps 94 may for example be made of metals such as gold, copper, aluminum, a multilayer stack such as titanium/platinum/gold, or a multi-composite alloy such as nickel-germanium. Metals are generally more highly conducting, so may provide certain added advantages over n-InP and the like.

The voltage control taps 94 do not electrically contact the metal of the travelling wave electrode 21 and a dielectric layer or other insulating structure may separate the two. Each voltage control tap 94 is further connected to a DC control source, directly or indirectly, so as to provide a DC control voltage to the conductive backplane 42.

It will be readily seen by one skilled in the art that by providing a DC control voltage through the voltage control taps at one or more locations along the backplane underneath the travelling wave electrode, a more thorough control of the voltage distribution along the length of the backplane can be obtained by comparison to prior art configurations.

In some implementations, each voltage control tap 94 extends from the conductive backplane 42 in a direction substantially perpendicular to the longitudinal axis of the travelling wave electrode 21, and reaches beyond the lateral extent of the area underneath the travelling wave electrode 21. In one embodiment, such as shown in FIG. 4, the modulator further includes a voltage equalization electrode 96 extending parallel to the travelling wave electrode 21, and preferably spaced laterally outward from the outermost transmission line conductor of the travelling wave electrode. The voltage control taps 94 are electrically connected to the voltage equalization electrode 96, at their extremity opposite their connection to the backplane. The voltage equalization electrode 96 is connected to a DC voltage source which provides the equalizing DC voltage, and is preferably made of a highly-conductive metal such as gold, copper, aluminum, a multilayer stack such as titanium/platinum/gold, or multicomposite alloy such as nickel-germanium. In embodiments where the voltage control taps 94 are also metal, the voltage equalization electrode 96 may be made of the same or of a different metal.

In the illustrated embodiment, the conductive backplane 42 has longitudinal extremities 100a, 100b extending outwardly of the area underneath the travelling wave electrode 21, and has an overall length commensurate with the length of the voltage equalization electrode 96. The voltage equalization electrode 96 may be shaped to bracket the travelling wave electrode 21. Contacts 102a, 102b preferably electrically connect the longitudinal extremities 100a, 100b of the conductive backplane to the voltage equalization electrode 96.

As best seen in FIG. 4A, in the illustrated SG configuration, the voltage control taps 94 run underneath at least one of the transmission line conductors, for example the ground transmission line conductor G, and an insulating mesa 98 embodying the insulating structure is sandwiched between each voltage control tap 94 and the transmission line conductor 30. The metal of the transmission line conductor rests upon the insulating mesa 98, which provides mechanical support as well as electrical insulation between the transmission line conductor and the voltage control tap. The insulating mesa may be made of one or more of various materials such as an undoped semiconductor, a semiconductor which is doped so as to be substantially insulating or dielectrics such as silicon dioxide, bisbenzocyclobutane and the like.

It will be readily understood by one skilled in the art that by judiciously designing the geometry of the voltage control taps, their influence on or their electrical coupling with the travelling wave electrode can be minimized, so as not to interfere with the normal operation of the modulator.

In the illustrated example of FIG. 4, a plurality of voltage control taps 94 connected to different locations along the conductive backplane 42 are schematically shown. In other configurations, different numbers of voltage control taps may be provided. The positioning of the connection point of the voltage control taps may also vary from one implementation to the next. In other variants, a single voltage control tap may be provided, for example connected at or close to the middle point of the travelling wave electrode. In some configurations, the numbers of voltage control taps may differ from the number of waveguide electrode pairs of the travelling wave electrode. The voltage control taps may be evenly distributed along the conductive backplane, such as shown in FIG. 4, or distributed according to a different pattern.

Figure 6:
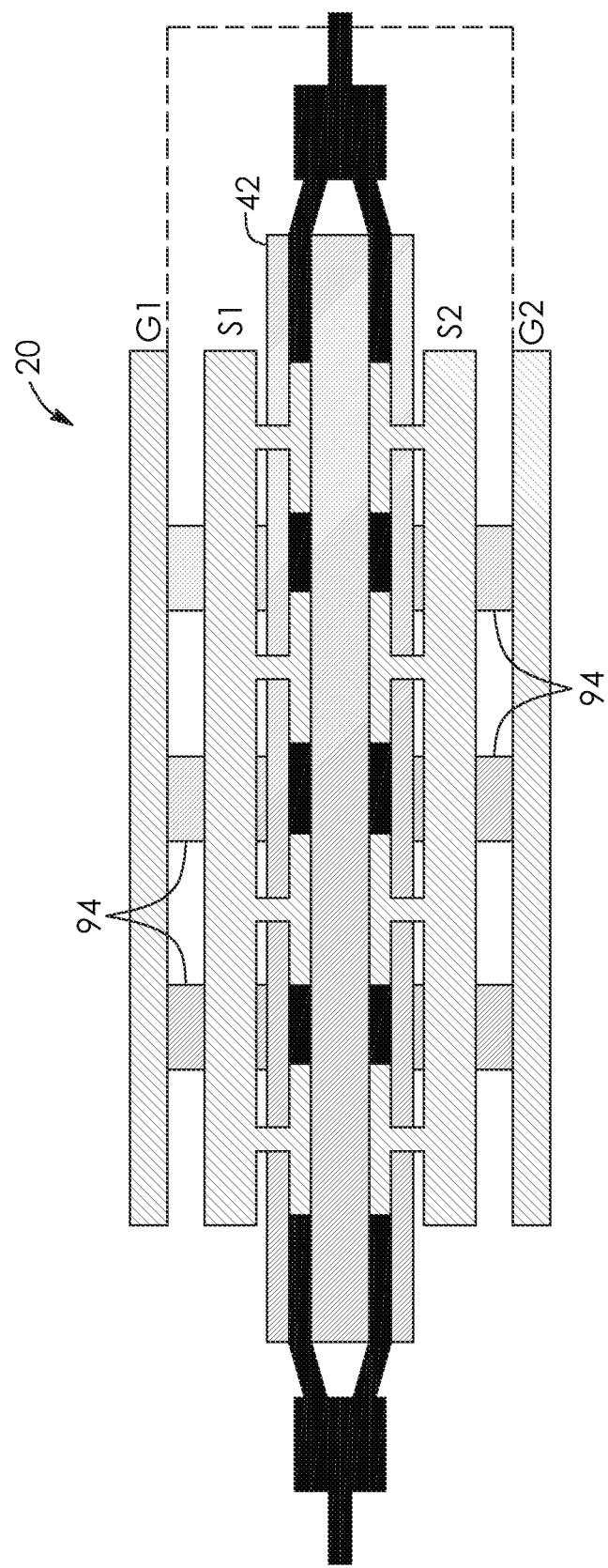
FIG. 6 is a simplified schematic top view of a series push-pull Mach-Zehnder modulator in a GSSG configuration, according to one embodiment.

Referring to FIG. 6, there is shown an embodiment of a Mach-Zehnder modulator 20 having transmission line conductors comprise two signal transmission line conductors S1, S2 and two ground signal line conductors G1, G2 in a GSSG configuration such as for example described in U.S. patent application published under number US2013/0209023 (PROSYK), the entire contents of which are incorporated herein by reference. A plurality of voltage control taps 94 are shown, extending transversally from either sides of the conductive backplane 42. In this embodiment, each voltage control tap 94 runs underneath the signal transmission line conductor S1 or S2 on the same side of the modulator 20, and is connected to the corresponding ground transmission line conductors G1 or G2. The ground transmission line conductors G1, G2 inherent to the design may therefore be used to perform the same function as the voltage equalization electrode of the previous embodiment, and since the ground transmission line conductors are designed to interact with the RF mode of the electrical modulation signal, there is no need to route them a far lateral distance from the travelling wave electrode and to make them narrow. The size and cost of the chip can be reduced, and the voltage equalization may be particularly effective since the ground transmission line conductors can have very low resistance.

Figure 7:
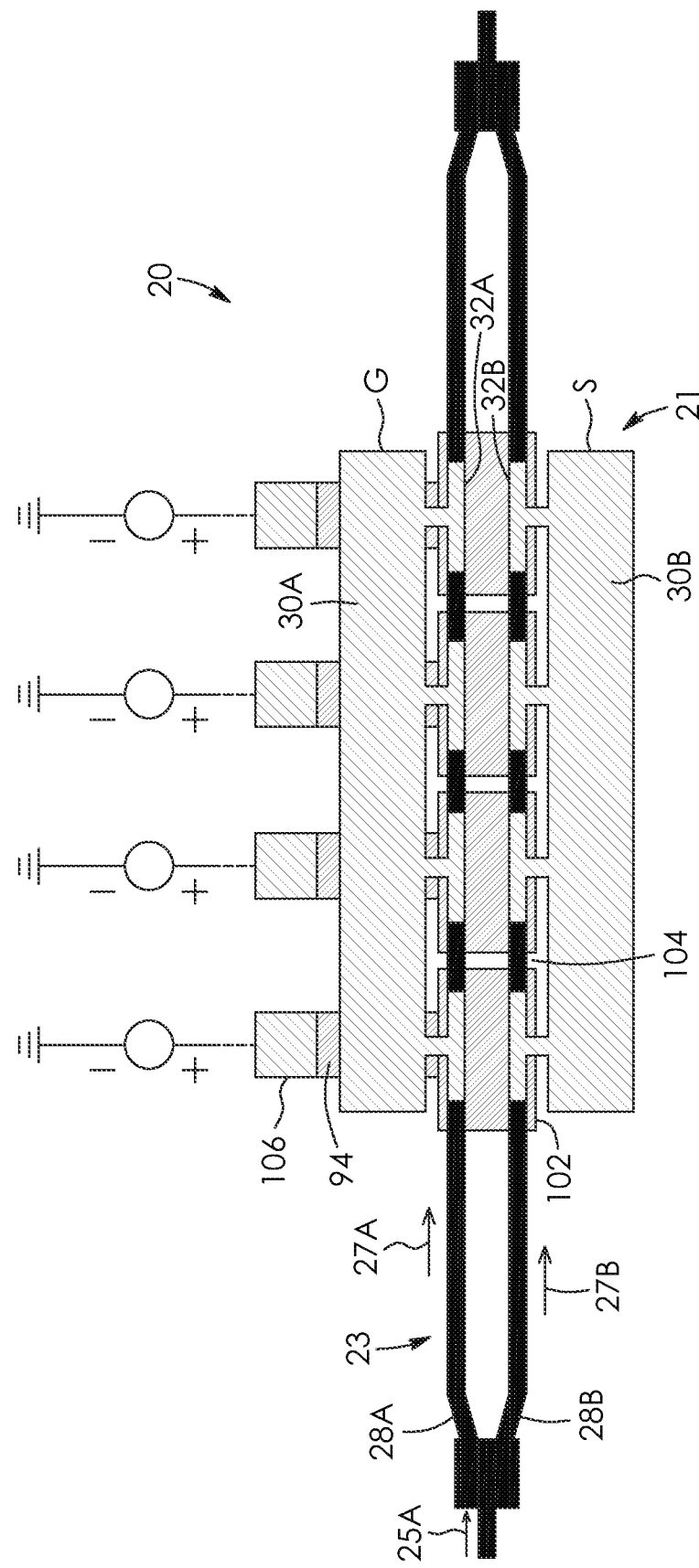
FIG. 7 is a simplified schematic top view of a series push-pull Mach-Zehnder modulator with backplane segments, according to one embodiment.

Referring to FIG. 7, there shown a Mach-Zehnder modulator 20 according to an alternative embodiment of the invention. As with previous embodiments, the Mach-Zehnder modulator 20 includes an optical structure 23 dividing the input optical beam 25 into two optical beam components 27A, 27B propagating in two parallel optical waveguide branches 28A, 28B, respectively, and recombining the optical beam components 27A, 27B downstream the optical waveguide branches 28A, 28B. The Mach-Zehnder modulator 20 further includes a series push-pull travelling wave electrode 21 extending over the optical waveguide branches 28A, 28B and modulating the relative phase of the optical beam components 27A, 27B. The travelling wave electrode 21 includes one or more signal and ground transmission line conductors 30A, 30B, and pairs of waveguide electrodes 32A, 32B such as described above. In the illustrated embodiment of FIG. 7 a SG configuration is shown, but other configurations such as GSSG and the like may alternatively be considered.

The modulator of FIG. 7 further includes a plurality of conductive backplane segments 102 extending underneath the optical waveguide branches 28A, 28B and the travelling wave electrode 21. Each conductive backplane segment 102 provides an electrical signal path for the electrical modulation signal between the respective waveguide electrodes 32A, 32B of the corresponding pair or pairs. In the illustrated embodiment each backplane segment 102 is shown dedicated to each pair of waveguide electrodes 32A, 32B. In other embodiments, several pairs of waveguide electrodes 32A, 32B may be associated with a same backplane segment 102. Adjacent backplane segments 102 are preferably separated from each other by separated by a low conductivity gap 104. Each low conductivity gap 104 may for example be embodied by a structure made of one or more materials such as an undoped semiconductor, a semiconductor doped so as to be substantially insulating, a doped semiconductor which is subsequently implanted with ions so as to be substantially insulating, a volume of semiconductor that has been etched away and subsequently contains ambient gas such as air, an insulating dielectric or the like.

Resistance between consecutive backplane segments 102 in this embodiment would substantially exceed the resistance of an equivalent section of backplane material, had the backplane been continuous, such as in the embodiment of FIG. 4. For example, if a continuous section of backplane has a longitudinal resistance of 10 Ohms between each portions of the backplane 42 of FIG. 4, the resistance of the gap introduced between backplane segments 102 in FIG. 7 could be many times larger, such as 50 Ohms, and preferably many orders of magnitude higher, such as 1 Mega-Ohm or more. High electrical resistance between consecutive backplane segments can prevents parasitic DC currents from flowing between segments when different voltages are applied to the segments as described below.

The modulator 20 of this embodiment further includes one or more voltage control tap 94 electrically connected to each conductive backplane segment 102. The connection between each voltage control tap 94 and the corresponding backplane segment 102 is disposed within an area underneath the travelling wave electrode 21. The voltage control taps 94 provide an equalizing DC control voltage to the corresponding backplane segment 102. For example, each voltage control tap 94 may be electrically connected to a dedicated voltage control pad 106, and each voltage control pad 106 may be electrically connected to a separate DC source. In this embodiment, the bias voltage applied to each backplane segment 102 may be controlled individually and independently, enabling an arbitrary profile for the DC control voltage along the length of the travelling wave electrode. In other variants, some or all of the voltage control taps 94 may be electrically connected to a same DC source, for example through a voltage equalization electrode such as shown with respect to previous embodiments, in which case a voltage equalization effect on the DC bias of the commonly grounded background segments can be obtained.

In the embodiment of FIG. 7, the voltage control taps 94 run underneath the ground transmission line conductor G of a SG configuration, similarly to the embodiment of FIG. 4, and may be separated from the ground transmission line conductor by an insulating mesa such as explained above. In other variants, multiple backplane segments may be used with other configurations, for example with a GSSG configuration such as shown in FIG. 6.

Figure 8:
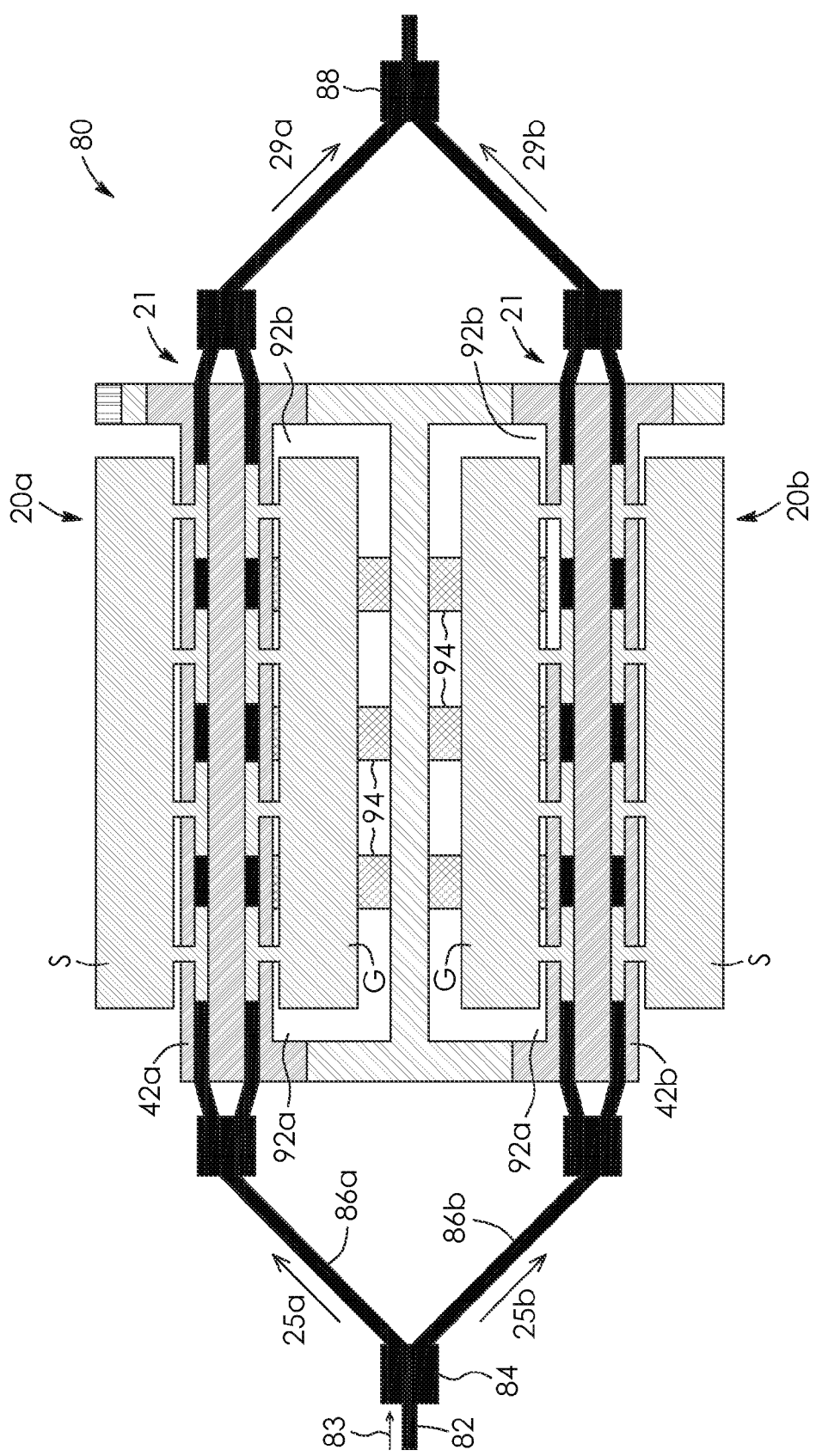
FIG. 8 is a simplified schematic top view of a IQ modulator based on a two series push-pull Mach-Zehnder modulators in a SG configuration, according to one embodiment.

Referring to FIG. 8, an IQ modulator 80 according to another embodiment is illustrated. As explained above, IQ modulators may be suited to switching between four states, using a quadrature phase shift keying, which can provide an increase in data rate and an efficient use of the optical spectrum. The IQ modulator of FIG. 8 includes first and second series push-pull travelling wave Mach-Zehnder modulators 20a and 20b, nested within a parent Mach-Zehnder interferometer. The parent Mach-Zehnder modulator is defined by a parent input optical waveguide 82 which received an input optical signal 83, a parent beamsplitter 84 splitting the optical signal into first and second parent optical branches 86A and 86B. The light sent to the parent optical branches 86A, 86B defines the input optical beams 25a, 25b of the first and second Mach-Zehnder modulator 20a, 20b, respectively. A parent combiner 88 recombines the output optical beams 29a, 29b outputted by the individual Mach-Zehnder modulators 20a, 20b.

Figure 9:
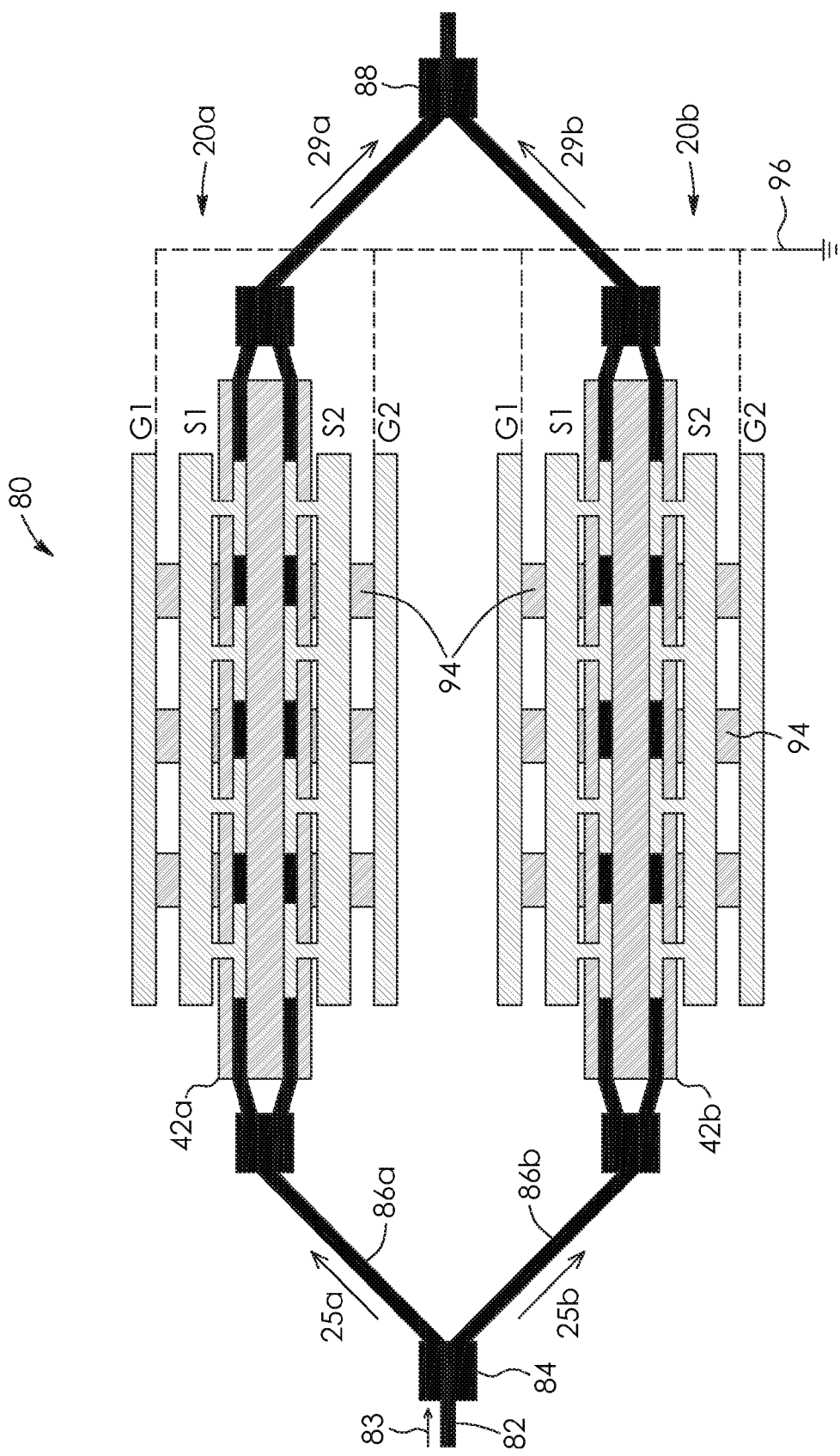
FIG. 9 is a simplified schematic top view of a IQ modulator based on a two series push-pull Mach-Zehnder modulators in a GSSG configuration, according to one embodiment.

In the embodiment illustrated in FIG. 8, the first and second Mach-Zehnder modulators 20a, 20b of the IQ modulator 80 are shown in a SG configuration similar to the one of FIG. 4. The connection of each voltage control tap 94 to the conductive backplane 42 is positioned within an area underneath the travelling wave electrode 21, that is, between the longitudinal end points 92a, 92b of the travelling wave electrode 21. The voltage control taps 94 do not electrically contact the metal of the travelling wave electrode 21 and a dielectric layer or other insulating structure may separate the two. Each voltage control tap 94 is further connected to a DC control source, directly or indirectly, so as to provide a DC control voltage to the conductive backplane 42. For example, a voltage equalization electrode such as described above may be provided for this purpose Referring to FIG. 9, there is shown an IQ modulator according to another embodiment of the invention. In this variant, the first and second Mach-Zehnder modulators 20a, 20b of the IQ modulator 80 are in a GSSG configuration similar to the one of FIG. 6. Each of these Mach-Zehnder modulators 20a, 20b is provided with its own backplane 42, and one or more voltage control taps 94 are arranged along the length of, and running substantially perpendicular to, the corresponding backplane 42 and travelling wave electrodes 21. The voltage control taps 94 electrically connect the ground transmission line conductor G1, G2 to the corresponding backplane 42 while electrically bypassing the signal transmission line conductors. All the ground transmission line conductors G1, G2 are electrically connected to a common DC potential such as ground.

The Mach-Zehnder modulators and IQ modulators described above may be fabricated using standard may be fabricated using techniques well known in the art, such as indium phosphide based photolithographic techniques or Si-based CMOS technology. In some implementations, all the above elements can be monolithically integrated onto a single substrate, and one or more off-chip DC voltage sources used.

Of course, numerous modifications could be made to the embodiments above without departing from the scope of the invention as defined in the appended claims.

The invention claimed is:

1. A Mach-Zehnder optical modulator for modulating an input optical beam according to an electrical modulation signal, the Mach-Zehnder modulator comprising an optical structure dividing the input optical beam into two optical beam components propagating in two parallel optical waveguide branches, respectively, and recombining said optical beam components downstream the optical waveguide branches, the Mach-Zehnder modulator further comprising:
   a series push-pull travelling wave electrode extending over the optical waveguide branches and modulating a relative phase of the optical beam components, said travelling wave electrode comprising:

transmission line conductors conveying the electrical modulation signal; and a plurality of pairs of waveguide electrodes, the waveguide electrodes of each pair being coupled to one of the optical waveguide branches, respectively, and electrically connected to one of the transmission line conductors, respectively;

a conductive backplane extending underneath the optical waveguide branches and the travelling wave electrode, the conductive backplane providing an electrical signal path for the electrical modulation signal between the respective waveguide electrodes of each pair; and at least one voltage control tap electrically connected to the conductive backplane within an area underneath the travelling wave electrode and providing an equalizing DC control voltage to the conductive backplane.

2. The Mach-Zehnder optical modulator according to claim 1, wherein the at least one voltage control tap comprises a plurality of voltage control taps connected to different locations along the conductive backplane.

3. The Mach-Zehnder optical modulator according to claim 1, wherein each of the at least one voltage control taps extends from the conductive backplane in a direction substantially perpendicular to a longitudinal axis of the travelling wave electrode, and reaches beyond a lateral extent of the area underneath the travelling wave electrode.

4. The Mach-Zehnder optical modulator according to claim 1, further comprising a voltage equalization electrode extending parallel to the travelling wave electrode, each of the at least one voltage control taps being electrically connected to the voltage equalization electrode.

5. The Mach-Zehnder optical modulator according to claim 4, wherein the voltage equalization electrode is shaped to bracket the travelling wave electrode.

6. The Mach-Zehnder optical modulator according to claim 5, wherein the conductive backplane has longitudinal extremities extending outwardly of the area underneath the travelling wave electrode, and the modulator further comprises contacts electrically connecting said longitudinal extremities of the conductive backplane to the voltage equalization electrode.

7. The Mach-Zehnder optical modulator according to claim 1, wherein the transmission line conductors comprise a signal transmission line conductor S and a ground transmission line conductor G in a SG configuration.

8. The Mach Zehnder optical modulator according to claim 7, where the at least one voltage control tap runs underneath at least one of the transmission line conductors, and the modulator further comprises an insulating structure sandwiched between the at least one voltage control tap and the at least one of the transmission line conductors.

9. The Mach-Zehnder optical modulator according to claim 1, wherein the transmission line conductors comprise two signal transmission line conductors S and two ground transmission line conductors G in a GSSG configuration.

10. The Mach-Zehnder optical modulator according to claim 9, wherein each of the at least one voltage control tap is connected to one of the ground transmission line conductors G.

11. The Mach Zehnder optical modulator according to claim 10, where the at least one voltage control tap runs underneath one of the signal transmission line conductors, and the modulator further comprises an insulating structure between the at least one voltage control tap and the one of the signal transmission line conductors.

12. A Mach-Zehnder optical modulator for modulating an input optical beam according to an electrical modulation signal, the Mach-Zehnder modulator comprising an optical structure dividing the input optical beam into two optical beam components propagating in two parallel optical waveguide branches, respectively, and recombining said optical beam components downstream the optical waveguide branches, the Mach-Zehnder modulator further comprising:

a series push-pull travelling wave electrode extending over the optical waveguide branches and modulating a relative phase of the optical beam components, said travelling wave electrode comprising:

transmission line conductors conveying the electrical modulation signal; and a plurality of pairs of waveguide electrodes, the waveguide electrodes of each pair being coupled to one of the optical waveguide branches, respectively, and electrically connected to one of the transmission line conductors, respectively;

a plurality of conductive backplane segments extending underneath the optical waveguide branches and the travelling wave electrode, each of the conductive backplane segments providing an electrical signal path for the electrical modulation signal between the respective waveguide electrodes of at least one of said pairs; and at least one voltage control tap electrically connected to each of the conductive backplane segments within an area underneath the travelling wave electrode and providing a DC control voltage to the corresponding conductive backplane segment.

13. The Mach-Zehnder optical modulator according to claim 12, wherein each of the at least one voltage control taps extends from the conductive backplane in a direction substantially perpendicular to a longitudinal axis of the travelling wave electrode, and reaches beyond a lateral extent of the area underneath the travelling wave electrode.

14. The Mach-Zehnder optical modulator according to claim 13, wherein the transmission line conductors comprise a signal transmission line conductor S and a ground transmission line conductor G in a SG configuration.

15. The Mach Zehnder optical modulator according to claim 14, where the at least one voltage control tap runs underneath at least one of the transmission line conductors, and the modulator further comprises an insulating structure sandwiched between the at least one voltage control tap and the at least one of the transmission line conductors.

16. The Mach-Zehnder optical modulator according to claim 12, comprising low conductivity gaps separating adjacent ones of said backplane segments.

17. The Mach-Zehnder optical modulator according to claim 12, comprising a plurality of each voltage control pads, each voltage control tap being electrically connected to a respective one of said voltage control pads.

18. The Mach-Zehnder optical modulator according to claim 17, wherein each voltage control pad is electrically connected to a separate DC source.

19. An in-phase quadrature optical modulator comprising a parent Mach-Zehnder interferometer, comprising:

a parent input optical waveguide receiving an input optical signal;

a parent beamsplitter splitting the input optical signal into parent optical beams propagating in first and second parent optical branches;

first and second Mach-Zehnder optical modulators respectively provided in the first and second parent optical branches, and a parent combiner recombining the parent optical beams downstream the Mach-Zehnder modulators;

each Mach-Zehnder optical modulator comprising:

an optical structure dividing the corresponding parent optical beam into two optical beam components propagating in two parallel optical waveguide branches, respectively, and recombining said optical beam components downstream the optical waveguide branches;

a series push-pull travelling wave electrode extending over the optical waveguide branches and modulating a relative phase of the optical beam components, said travelling wave electrode comprising:

transmission line conductors conveying an electrical modulation signal; and a plurality of pairs of waveguide electrodes, the waveguide electrodes of each pair being coupled to one of the optical waveguide branches, respectively, and electrically connected to one of the transmission line conductors, respectively;

a conductive backplane extending underneath the optical waveguide branches and the travelling wave electrode, the conductive backplane providing an electrical signal path for the electrical modulation signal between the respective waveguide electrodes of each pair; and at least one voltage control tap electrically connected to the conductive backplane within an area underneath the travelling wave electrode and providing an equalizing DC control voltage to the conductive backplane.

20. The in-phase quadrature optical modulator according to claim 19, wherein the transmission line conductors of each Mach-Zehnder modulator comprise a signal transmission line conductor S and a ground transmission line conductor G in a SG configuration.

21. The in-phase quadrature optical modulator according to claim 19, wherein the transmission line conductors of each Mach-Zehnder modulator comprise two signal transmission line conductors S and two ground transmission line conductors G in a GSSG configuration.

* * * * *